United States Patent [19]

Rathjens et al.

[11] 4,402,009
[45] Aug. 30, 1983

[54] METHOD AND APPARATUS FOR ENHANCING AN INCOMPLETE, LIMITED BANDWIDTH PICTURE GENERATED BY AN IMAGE SENSOR

[75] Inventors: Dieter Rathjens; Gerhard Schöne, both of Wedel, Fed. Rep. of Germany

[73] Assignee: Licentia Patent-Verwaltungs-GmbH, Frankfurt am Main, Fed. Rep. of Germany

[21] Appl. No.: 252,150

[22] Filed: Apr. 8, 1981

[30] Foreign Application Priority Data

Apr. 14, 1980 [DE] Fed. Rep. of Germany ....... 3014262

[51] Int. Cl.³ ............................................. H04N 7/18
[52] U.S. Cl. ................................... 358/125; 358/113; 358/138; 364/516
[58] Field of Search ............... 358/138, 125, 126, 113; 364/516

[56] References Cited

U.S. PATENT DOCUMENTS 2,921,124  1/1960  Graham ............................. 358/138
4,133,004  1/1979  Fitts .................................... 358/125

*Primary Examiner*—Howard Britton
*Attorney, Agent, or Firm*—Spencer & Kaye

[57] ABSTRACT

Apparatus for enhancing incomplete, limited bandwidth, sequential signals generated by an image sensor. Each of the incomplete signals comprises a plurality of alternate lines containing information, the lines interposed therebetween being blanked. A picture display device is also provided, and an intermediate storage device interposed between the image sensor and the display device. The storage device stores a first of the incomplete image signals and combines it with the next sequential image signal to form a complete image signal. The complete image sgnal, which is displayed on the display device, contains the information in the next incomplete image signal on alternate lines, the lines therebetween containing the information in the first incomplete image signal. The invention also constitutes a method for enhancing incomplete limited bandwidth sequential signals wherein a first of these signals is stored and then combined with the next sequential image signal to form the complete image signal.

11 Claims, 5 Drawing Figures

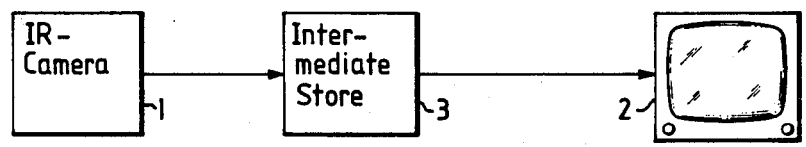
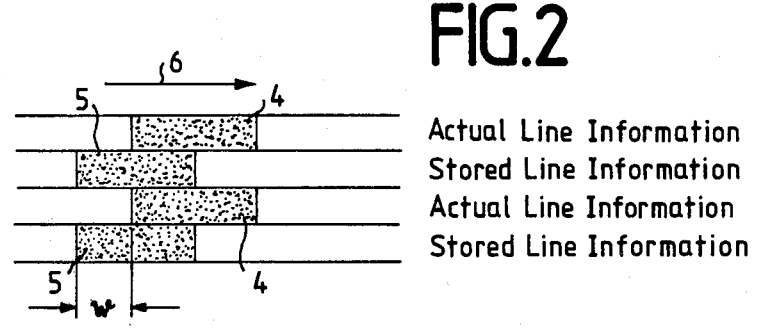
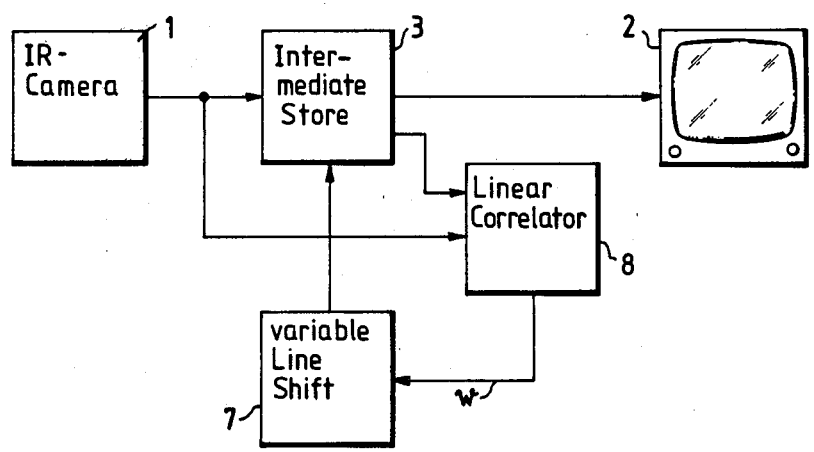

METHOD AND APPARATUS FOR ENHANCING AN INCOMPLETE, LIMITED BANDWIDTH PICTURE GENERATED BY AN IMAGE SENSOR

BACKGROUND OF THE INVENTION

This invention relates to a method for enhancing an incomplete, limited bandwidth picture generated by an image sensor, and an apparatus for carrying out the method. It is known that a thermal imaging camera produces an image for a picture display device which is incomplete as compared to that obtained with a conventional television system. Further, the image is limited in bandwidth since, in a relevant section of the image, only every other line contains recorded information. The lines reproduced between these information-containing lines are absent; that is, they are black or blanked. Such a picture is very annoying to the observer.

It is an object of the present invention to furnish a method and apparatus for improving such a picture by providing a full image with information in every line.

SUMMARY OF THE INVENTION

In accordance with the present invention, apparatus is provided for enhancing incomplete limited bandwidth sequential signals generated by an image sensor. Each of the incomplete signals comprises a plurality of alternate lines containing information, the lines interposed therebetween being blanked. A picture display device is also provided, and an intermediate storage device interposed between the image sensor and the display device. The storage device stores a first of the incomplete image signals and combines it with the next sequential image signal to form a complete image signal. The complete image signal, which is displayed on the display device, contains the information in the next incomplete image signal on alternate lines, the lines therebetween containing the information in the first incomplete image signal.

The invention also constitutes a method for enhancing incomplete limited bandwidth sequential signals wherein a first of these signals is stored and then combined with the next sequential image signal to form the complete image signal.

An advantage of the invention, in addition to improving the image for better recognition on the screen of the picture display device, lies in the increase in the range of recognition. That is, the invention delivers to the human eye more detailed information describing the scene and the targets.

Moreover, automatic target tracking devices can easily be combined with the disclosed apparatus.

BRIEF DESCRIPTION OF THE DRAWINGS

FIG. 1 is a block circuit diagram of an image generating device together with an image enhancing device;

FIG. 2 is an illustration to explain the phase shift between lines;

FIGS. 3 and 4 are block circuit diagrams of the image improving device; and

DETAILED DESCRIPTION OF THE PREFERRED EMBODIMENTS

FIG. 1 shows an infrared camera 1 acting as an image sensor, a picture display device 2 and an intermediate storage device 3 interposed between the IR camera and the picture display device. The camera 1 may, for example, be a "Mini-Flirp" manufactured by Honeywell, Inc., and the intermediate store 3 a conventional RAM Type 4116 made by Mostek. The store 3 provides digital intermediate storage of the video signals generated by the IR camera 1.

These components may be part of an automatic target tracking device having a digital target storage which operates according to the correlation principle.

Figure 5:
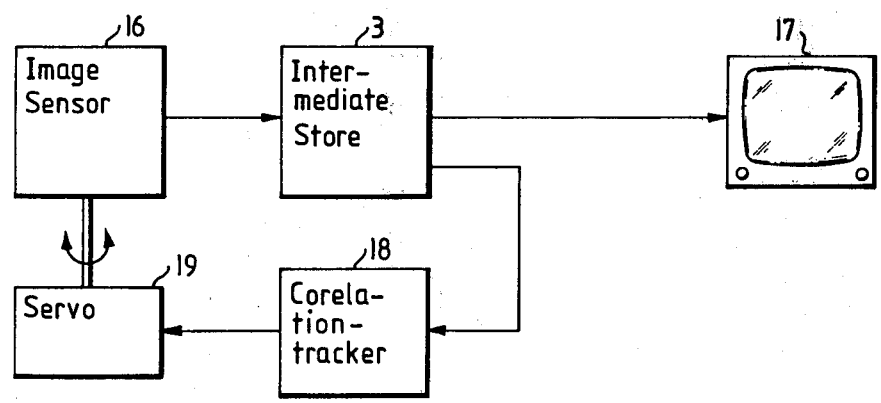
FIG. 5 is a block circuit diagram of an automatic target tracking system with an image enhancing device.

An automatic target tracking system is shown in FIG. 5. In this system, a signal from an image sensor 16 is supplied to a picture display device 17 and is observed by an operator. Between the image sensor 16 and the picture display device 17 an intermediate storage device 3 is interposed. A signal is conducted from the signal line between the image sensor 16 and the picture display device 17 to a pursuit device 18, such as a tracker, which energizes a servo-device 19. The servo-device 19 drives the image sensor 16. The tracker 18 operates according to the correlation principle, by which an image evaluation logic means compares stored images of an actual scene with a stored reference view of the target and, after each image, supplies an off-target signal to the automatic following system 19. An advantage of this system for an operator lies in the increase in the range of recognition, in the range of tracking and in the security of tracking.

The IR camera 1 generates a limited bandwidth, incomplete standard television signal wherein every other line contains recorded information in the relevant image section. The lines interposed between these lines are blanked; that is, they are black. In order to obtain a complete picture on the monitor of the picture display device 2, the intermediate store 3 stores information-containing lines of an image furnished by the IR camera 1 and fills the blank lines of the subsequent actual image furnished by the IR camera 1 with the stored information-containing lines of the preceding image. Thus, the intermediate store 3 furnishes to the picture display device 2 a complete picture which is composed of the stored information-containing lines of a first IR image and of the actual information-containing lines of the next or second IR image.

The combining or interlacing of the IR images is effected in the shortest possible intervals and at the single full image frequency. This is possible because the interlacing is effected in every field. For example, if 127 lines each containing 512 image points at a depth of 8 bits are stored per field, this would result in a total store capacity of only 128 K-bytes (1 image point=1 byte) with complete replacement of the blank lines.

No fixed association of the address with the image points is provided since otherwise twice the store capacity would be required. With a fixed association of address and line, twice the store capacity is required because the line information is renewed in every other field. The variable (rotating) store address requires only the single store capacity because the read-out line information from the preceding field (line x) is covered by the information of the actual field (line x+1).

When moving images are covered by the IR camera, a phase shift (line offset) occurs between the stored information-containing lines of the preceding IR image and the actual information-containing signals of the subsequent IR image. This phase shift is designated w in FIG. 2 in which the uppermost information line 4 represents information being received at a given instant and the information line 5 therebelow represents information stored from the preceding field. The same applies for the information lying below these two lines, again marked 4 and 5, respectively. The direction of movement of the target is identified by the arrow 6.

FIG. 3 shows an apparatus in which the phase shift w between the stored information-containing lines 5 and the actual information containing lines 4 is realized even when the IR camera 1 is stationary. The apparatus of FIG. 3 transfers the phase shift to the background of the target object, blurring the background, and thereby increasing the tracking reliability.

In FIG. 3, components corresponding to those of FIG. 1 bear the same reference numerals. In addition, a variable line shift device 7 is provided which may be a conventional transistor-transistor logic (TTL) shift register having a variable clock pulse frequency. This shift register exhibits a relatively small shift at high frequencies and a relatively large shift at low frequencies. Adder integrated circuits, such as the TTL module 74 LS 283 manufactured by Texas Instruments, can also be used for the variable line shift device 7. A variable readout of the intermediate store 3 can be effected which is shiftable in accordance with the shift w.

The variable line shift device 7 is preceded by a linear correlator 8 which may, for example, be a Model TD C 1004 J or TD C 1023 J made by TRW. Correlator 8 receives input signals from the IR camera 1 and from the intermediate store 3, emits a setting signal W proportional to the line shift w between the information carrying lines 4 and 5, and feeds this setting signal to the variable line shift device 7. This may occur, for example, only after a given threshold has been exceeded. Alternatively, exceeding of the threshold can be used as an indication that a moving object is present in the image.

Additional devices for performing other image improving functions in connection with the information stored in the intermediate store 3 may also be provided. For example, image-restoration, image-coding or image-transformation devices employing scan-conversion or geometry-transformation.

Figure 4:
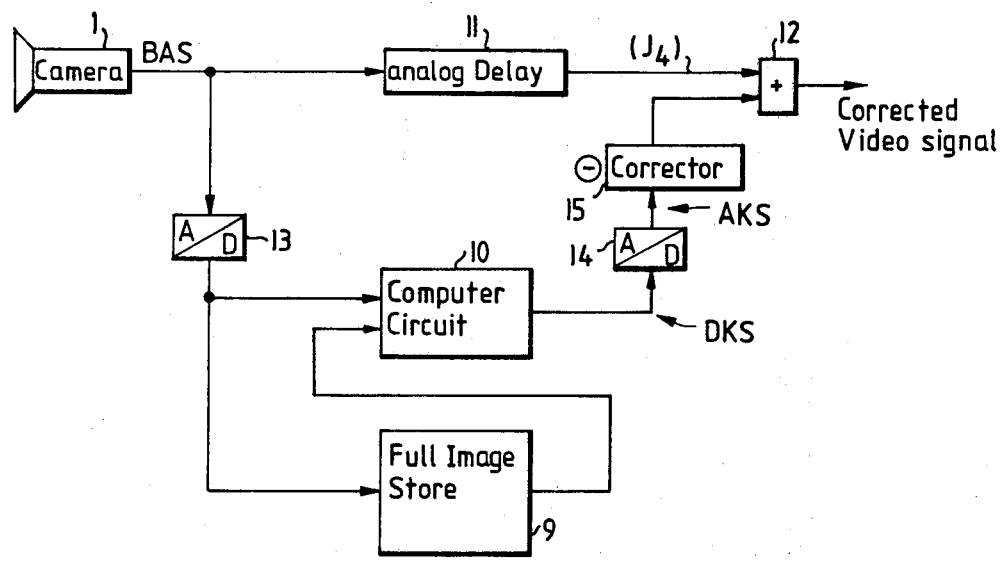

Referring to FIG. 4, the image improving device shown therein includes an intermediate store as employed in the embodiments of FIGS. 1 and 3 in the form of a digital full image store 9 and a computer circuit 10. The computer circuit 10 is of the conventional TTL type and the full image store 9 may be a Type 4116 RAM made by Mostek. The analog video signal BAS furnished by the IR camera 1 is fed via an analog delay line 11 to an input of a summing device 12, which may for example be an operational amplifier No. 1430 made by Teledyne Philbrick. The video signal BAS is also coupled through an analog-to-digital converter 13 (Type TD C 1007 J made by TRW) to an input of the computer circuit 10 and the input of the full image store 9. The output of the computer circuit 10 is connected, via a digital/analog converter 14 (Type TD C 1016 J-10 made by TRW) to a second input of the summing device 12 whose output is electrically coupled to the input of a picture display device (not shown in FIG. 4). An adjustable correction member 15, which may be an operational amplifier, is coupled between the digital-/analog converter 14 and the summing device 12.

The apparatus shown in FIG. 4 improves the image furnished by the IR camera in that the vertical edge steepness of the video signal is digitally improved; that is, the descending portion of the contrast transfer function is increased mathematically. For this purpose, the computer circuit 10 generates a digital correction signal DKS which is converted to an analog correction signal AKS by the digital-to-analog converter 14 and added in the summing device 12 to the delayed analog video signal BAS.

Calculation of the correction signal DKS for an actual field requires that a previous field be stored in the digital full image store 9. Every image point is corrected by means of a momentary image point of an actual image as well as an image point of a stored field lying thereabove. To make this possible, the store must be divided into a region of odd-numbered video lines.

The corrected video signal is generated at the output of the summing device 12 and coupled to the series-connected picture display device. This corrected video signal is obtained for every image point by adding the delayed analog video signal BAS and the analog correction signal DKS must first be calculated by the computer circuit 10 according to the following formula:

$$DKS = I_5 \text{ upper neighbor} + I_5 \text{ lower neighbor,}$$

where $I_5$ is the stored information for one image point of the stored image.

The corrected video signal then results as follows:

$$J_{corr} = J_4 - \frac{J_{5o} + J_{5u}}{2} \cdot K,$$

where
$J_{corr}$ is the corrected information for one image point,
$J_4$ is the actual information for one image point of the actual image, and
K is a correction factor.

It will be understood that the above description of the present invention is susceptible to various modifications, changes and adaptations, and the same are intended to be comprehended within the meaning and range of equivalents of the appended claims.

What is claimed is:

1. In combination with a picture display device and an image sensor, said image sensor generating incomplete vertical bandwidth limited sequential image signals wherein each image signal comprises a plurality of alternate lines containing information, the lines interposed between said information containing lines being blanked, the method comprising the steps of:
   storing a first of said incomplete sequential image signals;
   combining said first stored incomplete sequential image signal with the next incomplete sequential image signal to form a complete image signal, said complete image signal comprising alternate lines containing the information in said next incomplete sequential signal and the lines therebetween containing the information in said first of said incomplete sequential image signals; and
   displaying said complete image signal on said display device.

2. Apparatus for enhancing incomplete vertical bandwidth limited image signals generated sequentially by an image sensor, each of said incomplete image signals having alternate lines containing information, the lines interposed therebetween being blanked, said apparatus comprising:
   a picture display device; and an intermediate storage device interposed between said image sensor and said picture display device, said storage device storing a first of said incomplete image signals and combining said first image signal with the next of said incomplete image signals to form a complete image signal, said complete image signal comprising alternate lines containing the information in said next incomplete image signal and the lines therebetween containing the information in said first incomplete image signal.

3. Apparatus as defined in claim 2 wherein said image sensor and said picture display device comprise an automatic target tracking system.

4. Apparatus as defined in claim 3 wherein said automatic target tracking system further comprises a correlator.

5. Apparatus as defined in claim 3 or 4 wherein said automatic target tracking system further comprises a digital target storage.

6. Apparatus as defined in claim 2 wherein said intermediate storage device has a control input, and wherein said apparatus further comprises a variable line shift device having its input coupled to the output of said image sensor and its output coupled to the control input of said intermediate storage device, said variable line shift device, when said image sensor is following a moving object, matching the phases of the lines in said first and next image signals so that said lines are in phase synchronism with each other.

7. Apparatus as defined in claim 6 which further comprises a linear correlator interposed between the output of said image sensor and the input of said variable line shift device, an input of said linear correlator being further coupled to an output of said intermediate store, said linear correlator generating a setting signal at the input of said variable line shift device which is proportional to the phase shift between adjacent lines in said complete image signal.

8. Apparatus as defined in claim 7 wherein said linear correlator generates said setting signal when a predetermined threshold has been exceeded.

9. Apparatus as defined in claim 2, 6 or 7 wherein said intermediate storage device comprises a digital full image store having its output coupled to the input of a computer circuit, the output of said computer circuit providing said picture display device with a corrected video signal.

10. Apparatus as defined in claim 9 which further comprises an analog delay circuit and an adder coupled between the output of said image sensor and said picture display device, one input of said adder being coupled to the output of said delay circuit; an analog-to-digital converter interposed between the output of said image sensor and inputs of said digital full image store and said computer circuit; and a digital-to-analog converter coupled between the output of said computer circuit and the other input of said adder.

11. Apparatus as defined in claim 10 wherein an adjustable correction member is interposed between the output of said digital-to-analog converter and the other input of said adder.

* * * * *